United States Patent
Martinot-Lagarde et al.

(10) Patent No.: US 8,704,976 B2
(45) Date of Patent: Apr. 22, 2014

(54) LIQUID CRYSTAL DISPLAY DEVICE AND CONTROL METHOD FOR A BISTABLE NEMATIC LIQUID CRYSTAL DISPLAY HAVING TWO STABLE TEXTURES COMPRISING A UNIFORM OR SLIGHTLY TWISTED STATE

(75) Inventors: Philippe Martinot-Lagarde, Marcoussis (FR); Stéphane Joly, Saint Saturnin (FR); Jean Denis Laffitte, Leuville sur Orge (FR)

(73) Assignee: Nemoptic, Magny les Hameaux (FR)

( * ) Notice: Subject to any disclaimer, the term of this patent is extended or adjusted under 35 U.S.C. 154(b) by 786 days.

(21) Appl. No.: 12/528,310

(22) PCT Filed: Feb. 20, 2008

(86) PCT No.: PCT/EP2008/052082
§ 371 (c)(1),
(2), (4) Date: Nov. 2, 2010

(87) PCT Pub. No.: WO2008/101969
PCT Pub. Date: Aug. 28, 2008

(65) Prior Publication Data
US 2011/0063536 A1    Mar. 17, 2011

(30) Foreign Application Priority Data

Feb. 17, 2007 (FR) .................................. 07 53398
Mar. 2, 2007 (FR) .................................. 07 53626

(51) Int. Cl.
- G02F 1/1347 (2006.01)
- G02F 1/1335 (2006.01)
- C09K 19/02 (2006.01)

(52) U.S. Cl.
USPC ............................. 349/76; 349/101; 349/179

(58) Field of Classification Search
USPC ................... 349/76, 101, 168, 177, 179, 186
See application file for complete search history.

(56) References Cited

U.S. PATENT DOCUMENTS

2007/0070001 A1 *   3/2007   Martinot-Lagarde et al. .. 345/87

FOREIGN PATENT DOCUMENTS

| FR | 2 874 446 A1 | 2/2006 |
| FR | 2 874 447 A1 | 2/2006 |
| WO | WO 03/090197 A1 | 10/2003 |
| WO | WO 2004/104980 A2 | 12/2004 |

OTHER PUBLICATIONS

Dozov, I., et al., "Nemoptic's Bistable Nematic Liquid-Crystal Technology," Information Display (Jan. 2002) pp. 10-12.

* cited by examiner

*Primary Examiner* — Paul Lee
(74) *Attorney, Agent, or Firm* — Blakely Sokoloff Taylor & Zafman

(57) ABSTRACT

A method for the control of a liquid crystal display that includes a matrix of pixels arranged in crossed lines and columns. A switching of state of the liquid crystal molecules, is controlled by application of an electrical control signal between two electrodes (50, 52) framing each pixel, generates a flow according to a particular direction (18), characterized in that, to control the switching of at least some of the pixels (P). The method includes applying to at least one neighboring pixel (58), according to the direction of flow, of a pixel (P) whose switching is controlled by the electrical control signal, auxiliary electrical signals whose amplitude is less than the anchorage breaking voltage and whose rising or falling edges are temporally placed in advance or in coincidence with the active falling edge of the electrical control signal, to favor the switching of the said pixel to be controlled (P).

20 Claims, 12 Drawing Sheets

Figure 1:
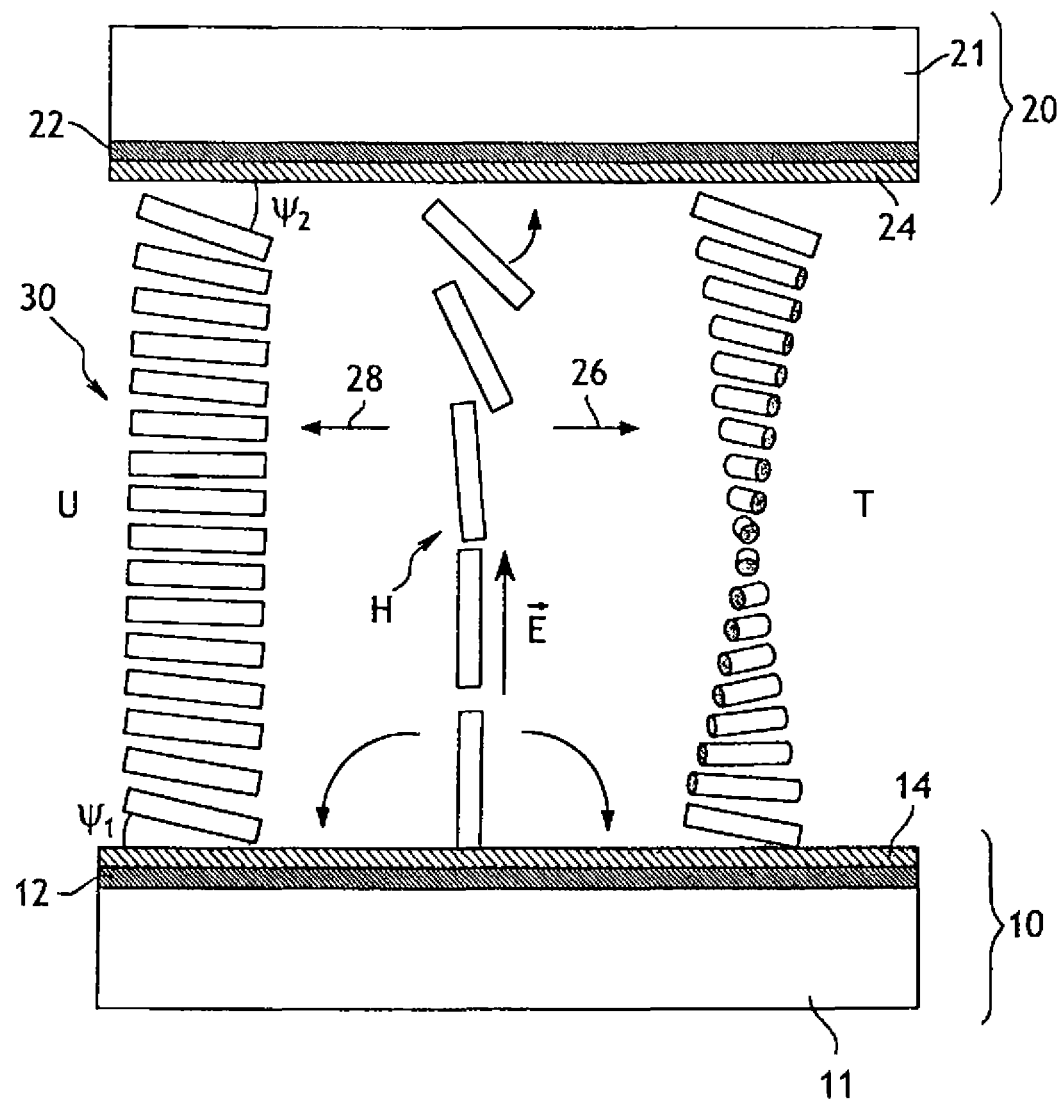

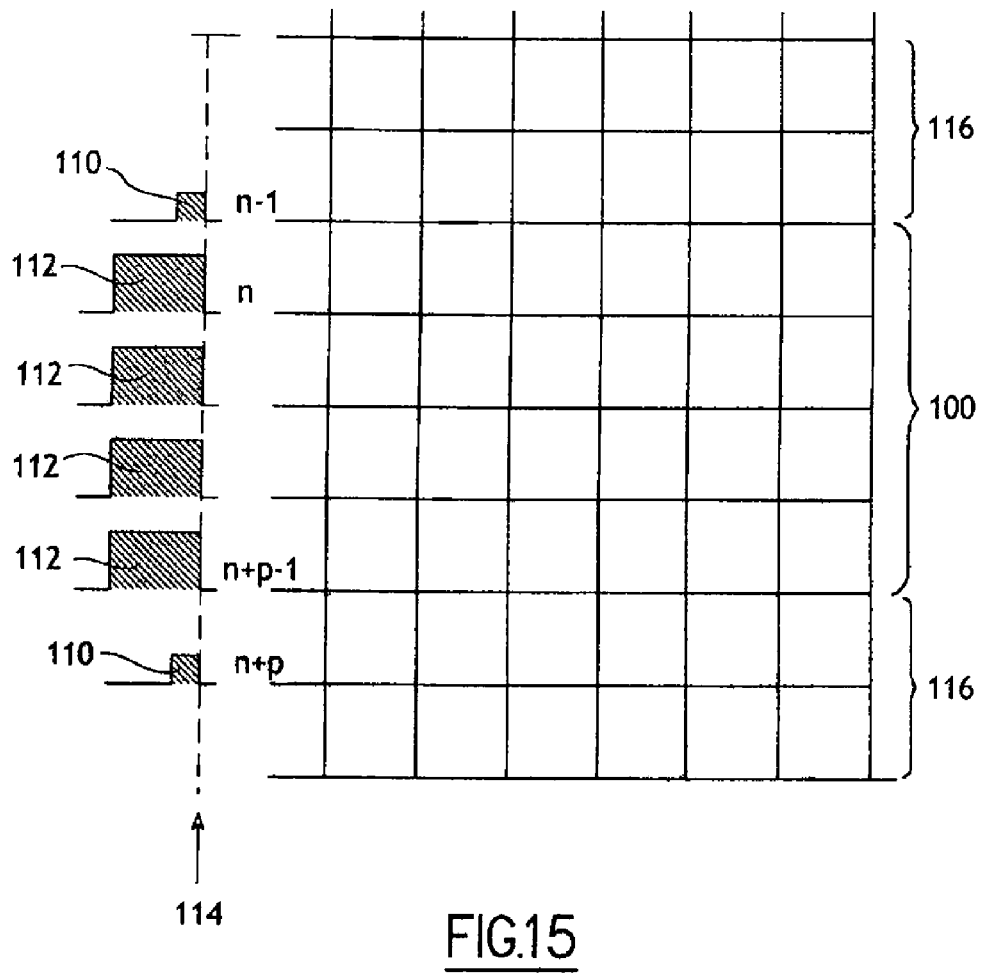
FIG.15
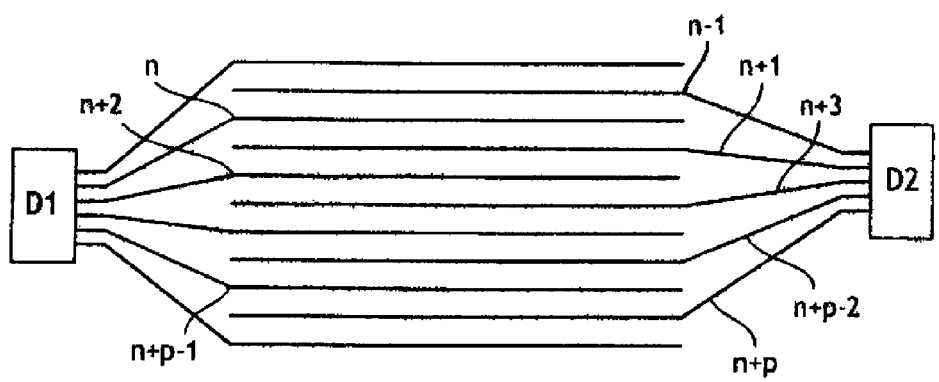
FIG.15bis

LIQUID CRYSTAL DISPLAY DEVICE AND CONTROL METHOD FOR A BISTABLE NEMATIC LIQUID CRYSTAL DISPLAY HAVING TWO STABLE TEXTURES COMPRISING A UNIFORM OR SLIGHTLY TWISTED STATE

This is a non-provisional application claiming the benefit of International application number PCT/EP2008/052082 filed Feb. 20, 2008.

TECHNICAL DOMAIN

This present invention relates the field of liquid crystal displays.

More precisely, this present invention concerns nematic bistable liquid crystal displays. It applies in particular to nematic bistable liquid crystal displays of which two stable textures differ by a twist of about 180°.

AIM OF THE INVENTION

The aim of this present invention is to improve the performance of the bistable display devices. In particular the objective of the invention is to improve, by the use of new means, the switching of states at the edges of the pixels.

PRIOR ART

Conventional LCD Displays

The most widespread liquid crystal displays use a liquid crystal of the nematic type. They are composed of a liquid crystal layer placed between two plates. Each plate includes a substrate, often in glass, on which have been deposited a conducting electrode and then a so-called anchor layer also called an alignment layer. The anchor layer exerts, on the adjacent liquid crystal molecules, a return torque that tends to orientate them parallel to a direction called the easy axis. The anchor layers are often implemented by a deposit of brushed polymer to create the direction of the easy axis. The latter is most often very close to the brushing direction.

The thickness of the cell thus constituted is rendered constant by distributing, between the plates, balls whose diameter is equal to the desired thickness (typically 1 to 6 µm).

Most of the liquid-crystal based devices proposed and manufactured at present are monostable. In the absence of an electrical field, the liquid crystal is oriented in accordance with a single texture. This corresponds to an absolute minimum of the elastic energy of the liquid crystal in the cell, given the anchorages on the two plates. Under an electrical field, this texture is deformed continuously and its optical properties vary as a function of the voltage applied. Near the plates, the anchor layers known as "strong anchor layers" maintain the direction of the molecules. Their direction varies little. On removal of the field, the nematic is returned by the anchorages onto the two plates. It comes back to a stable texture. The device is monostable. Those skilled in the art will recognise the operating method of the most widespread nematic displays, namely twisted nematics (TN), super-twisted nematics (STN), electrically controlled birefringent (ECB), vertically-aligned nematics (VAN), etc. Regarding addressing, these displays can be addressed directly (very low resolution), in multiplexed mode (medium resolution) or in active mode (high resolution).

State of the BiNem Technology

A new generation of nematic displays, known as "bistables", has appeared over the last few years. These work by switching between two states, and are stable in the absence of an electrical field. The external electrical field is applied only during the time necessary to switch the texture of the liquid crystal from one state to the other. In the absence of an electrical control signal, the display remains in the state attained. By virtue of its operating principle, this type of display consumes energy in proportion to the number of image changes. Thus, when the frequency of these changes reduces, the power necessary for the operation of the display tends toward zero.

Principle of Operation

The bistable display known as the BINEM ([I], [2]) is presented diagrammatically in FIG. 1. It uses two textures, one of which is uniform or slightly twisted (U) (illustrated on the left of FIG. 1) in which the molecules are substantially parallel to each other, and the other (T) (illustrated on the right of FIG. 1) that differs from the first by a twist of about ±180°, to within ±15°. The liquid crystal layer 30 is placed between two plates 20 and 10, which we will call the master plate and the slave plate. The master plate 20 includes a substrate 21, an electrode 22 and a anchor layer 24, creating a strong azimuthal and zenithal anchoring of the liquid crystal, with a "pre-tilt" in relation to the surface of the plate 20, whose value $\psi_2$ is conventional and close to 5°. The slave plate 10 includes a substrate 11, an electrode 12 and an anchor layer 14, to create a weak zenithal anchoring and a medium or strong azimuthal anchoring of the liquid crystal, and a very small "pre-tilt" ($\psi_1 \ll 1°$ [3],[8]). The two pre-tilts $\psi_1$, $\psi_2$ are in the same direction, meaning that, in the U texture, the liquid crystal molecules remain tilted with the same tilt sign over the full thickness of the cell. The usually transparent electrodes 12 and 22 deposited on the substrates 11 and 21 are used to apply a perpendicular electrical field to the plates 10 and 20.

The addition of polarisers to each of the substrates 11 and 21 on the outside of the cell, allows an optical state to be associated with each texture, such as dark for U and light for T, or vice-versa, depending on the angles of the two polarisers in relation to the anchorage directions.

The nematic is chiralised with a spontaneous pitch $p_0$, chosen to be close to four times the thickness d of the cell, in order to equalise the energies of the aforementioned two textures. The ratio between the thickness d of the cell and the spontaneous pitch $p_0$, namely $d/p_0$, is therefore about equal to 0.25±0.1. With no field, the states T and U are the minimal energy states, and the cell is bistable.

Under a strong electrical field, an almost homeotropic texture, denoted H and illustrated in the middle of FIG. 1, is obtained. In the vicinity of the surface of the slave plate 10, the molecules are perpendicular to it, the zenithal anchorage is said to be "broken". The break voltage is denoted as $V_{brk}$, which is the voltage corresponding to the breaking of the zenithal anchorage on the slave plate 10. In all the present document we will denote "anchorage breaking" the zenithal anchorage breaking.

This voltage $V_{brk}$ corresponds to an electric field for breaking so that $V_{brk}=E_{brk}\cdot d$. Typically $E_{brk}$ is comprised between 5 and 15V/µm at ambient temperature, for a weak zenithal anchorage layer such as the slave plate 10.

On removal of the electrical field, the cell evolves to one or other of the bistable textures U and T (see FIG. 1). When the control signals employed induce a strong flow of the liquid crystal in the vicinity of the master plate 20, the hydrodynamic coupling 26 between the master plate 20 and the slave plate 10 induces texture T. On the other hand, texture U is obtained by elastic coupling 28 between the two plates 10 and 20, aided by the slight tilt of the weak anchorage [1], [2].

In what follows, by the "switching" of a BiNem screen element, we will be referring to the fact of passing the molecules of the liquid crystal through the homeotropic state H (breakage of the anchorage), and then allowing it to evolve, on removal of the electrical field, to one of the two bistable textures U or T or to a coexistence of these textures. The switch-off of the electrical field corresponds to a falling edge of the voltage applied (reduction of the voltage in absolute value), which will be called the active falling edge when this falling edge is the one that is used, depending on its characteristics, to choose the final state in terms of texture (the pixel voltage can be multilevel [6], and only one of the falling edges is the active edge).

Figure 2:
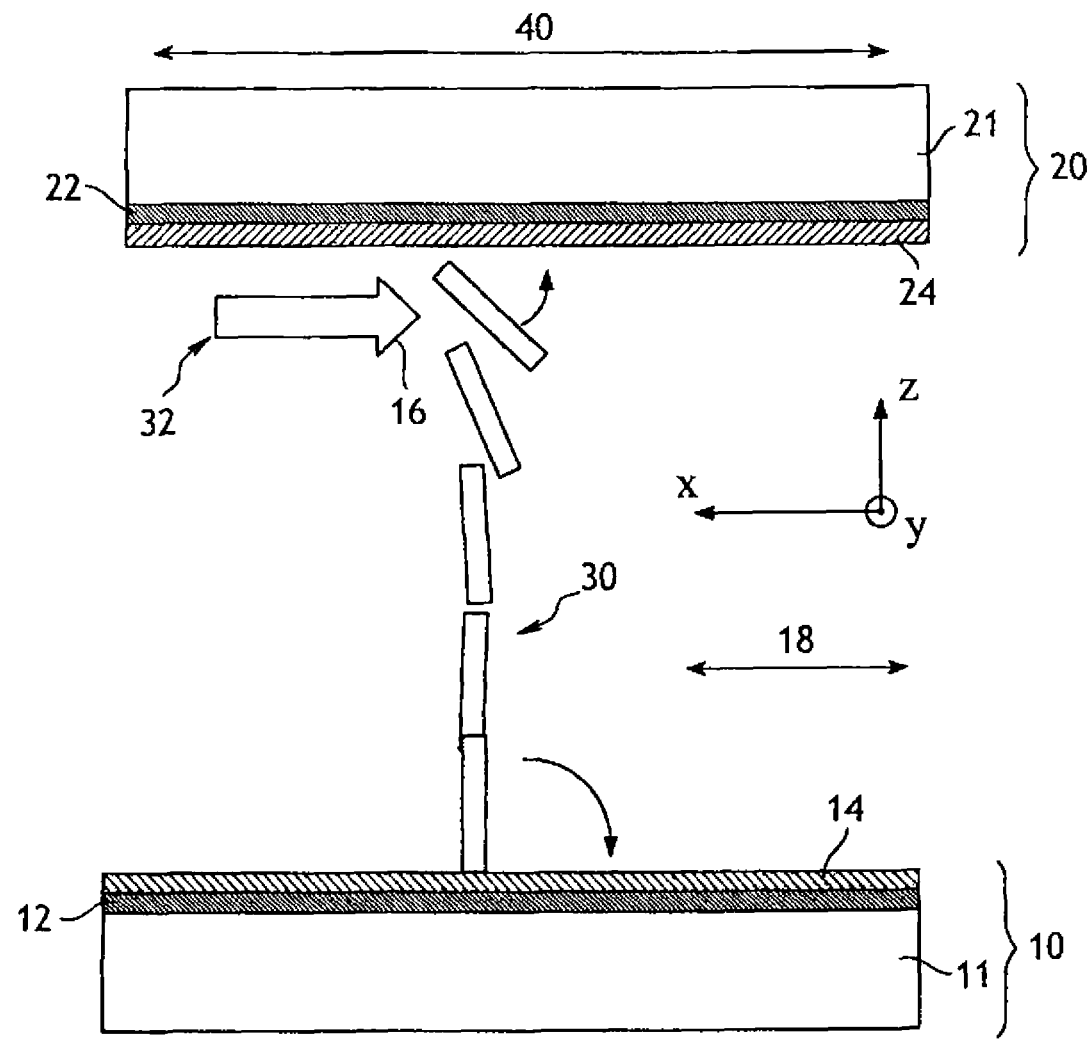

The hydrodynamic coupling [4] between slave plate 10 and master plate 20 is linked to the viscosity of the liquid crystal. On switch-off of the electrical field applied to the zone concerned, the return to equilibrium by the molecules anchored on the master plate 20 creates a falling flow 32 near the master plate 20, whose direction 16 is indicated in FIG. 2. The viscosity causes the falling flow 32 to diffuse throughout the thickness of the cell in less than one microsecond. If the falling flow 32 is strong enough near the slave plate 10, it tilts the molecules there in the direction that induces texture T. The molecules turn in opposite directions on the two plates 10 and 20. The return to equilibrium by the molecules near the slave plate 10 is a second engine for the flow, reinforcing it and helping with the homogeneous passage of the pixel to texture T. Thus the passage of the texture under field H to texture T is attained by virtue of the falling flow 32, and therefore the movement of the liquid crystal in the direction 16 in which the anchorage of the molecules on the master plate 20 is tilted (see FIG. 2), according to direction 18. This direction 18 of the falling flow close to the master plate is substantially parallel to the brushing direction of its alignment layer, which is referenced 40 in FIG. 2. It cannot be strictly parallel to it, due to the twist in the starting texture for example. Typically, it is parallel to it to within about ±10°.

The elastic coupling between the two plates 10, 20 gives a very slight tilt to the molecules near the slave plate 10, into texture H under the field, although the applied field tends to orientate them perpendicularly to the plates. In fact the strong tilted anchorage on the master plate 20 maintains a tilt on the adjacent molecules. The tilt near the master plate 20 is transmitted by the orientation elasticity of the liquid crystal up to the slave plate 10. On the slave plate 10, the anchorage and any tilt of the easy axis of the latter amplify the tilt of the molecules [5]. When, on removal of the field, the hydrodynamic coupling is insufficient to combat the residual tilt in the molecules near the slave plate 10, then the molecules near the two plates 10 and 20 come back to equilibrium by turning in the same direction, and texture U is obtained. These two rotations are simultaneous, and they induce flows in opposite directions that oppose each other. The total flow is practically zero. There is therefore very little overall movement of the liquid crystal during the passage from texture H to texture U.

The switching to U or to T of the pixel is a function of the intensity of the falling flow 32 created by the master plate 20. This flow diffuses to the slave plate 10, and the intensity of the flow obtained in the vicinity of the slave plate 10 determines the final texture obtained (U or T). In order to obtain a large falling flow 32 that will induce texture T, it is necessary to apply a pulse of electrical field with a steep-edged descent, such as a signal of the slot type for example. In order to obtain texture U, a pulse of electrical field with a slow-sided descent, generating a very weak falling flow, is necessary, such as a steadily falling slope for example or one in successive steps between the levels [1],[2],[6].

It is also possible to obtain grey levels in a pixel by controlling the intensity of the falling flow by variation of the voltage at the terminals of the pixel. For a given value of this varying voltage, one obtains, within a given pixel, one fraction of its surface in texture T and the other fraction in texture U. To another value of the varying voltage, and therefore of this falling flow, there corresponds a different ratio between the areas occupied by the two textures U and T. Grey levels are thus obtained [9].

The fact that the switching is directly associated with the intensity of the flow near one of the plates 10 and 20 is a special characteristic of the BiNem displays, and the conventional TN and STN displays do not switch by this principle.

Addressing

The 3 addressing modes developed for the standard liquid crystals (direct, multiplexed, and active) can be employed for the BiNem display. The most common mode for addressing the BiNem display is multiplexed passive addressing, but active addressing with the aid of transistors in thin layers is also possible [7]. In the active and passive multiplexed modes, the BiNem display is a matrix-type screen formed of n times m picture elements called pixels, with n being the number of lines and m the number of columns, and the addressing is effected line by line.

In the multiplexed passive mode, each pixel is composed of the intersection of a line conducting strip 52 and a column conducting strip 50. These perpendicular strips are deposited respectively on the master 20 and slave 10 plates (see FIG. 3). The zone located between two adjacent conducting strips carried by a given substrate 11 ou 21 is called the interpixel space. The zone composed of all of the pixels is called the matrix zone. Customarily, in the prior art, the matrix zone is the display zone, the zone in which one displays the content of the image that one wishes to view.

Outside of the matrix zone, the aforementioned conducting strips 50, 52 take the form of tracks 54, 56 that create the connection to the control circuits, called drivers, located on flexible connection elements welded to the screen for example. To display the coordinate pixel (n, m) we apply a line signal to line n and a column signal to column m.

Figure 4:
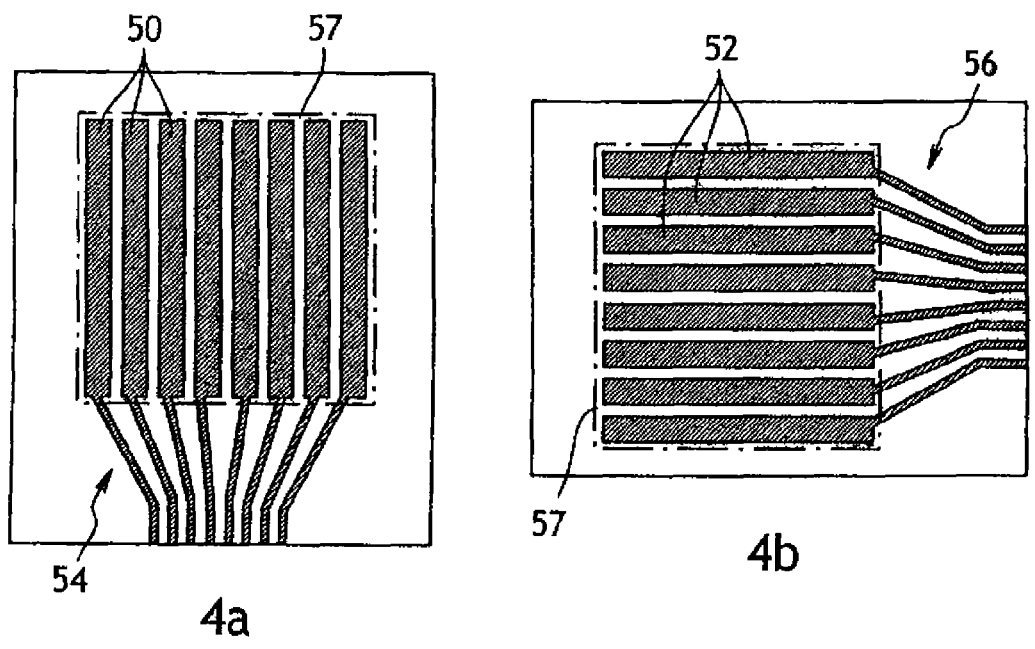

A principles diagram of the electrodes formed on the two glass substrates 11 and 21 of a conventional display according to the prior art is illustrated in FIG. 4. In general, the conducting electrodes are created with a transparent conducting material called ITO (a tin-doped indium oxide). But when the display is reflective, the electrodes located on the side opposite to the observer can be created from an opaque conducting material, such as aluminium. In order to execute the electrodes, a thin conducting layer is deposited on the two substrates 11 and 21 and then etched to the required design. FIG. 4a illustrates the mask used to etch the electrodes 50 on the so-called upper substrate 21, which in our example holds the columns. FIG. 4b illustrates the mask used to etch the electrodes 52 on the so-called lower substrate 11, which in our example hold the lines. In FIGS. 4a and 4b, we have thus referenced as 50 the strips forming the column electrodes, and as 52 the strips forming the line electrodes (these strips are used for addressing the appropriate zone), and then 54 and 56 the tracks used for connection of the aforementioned strips 50 and 52 to the drivers. The limits of the matrix zone correspond to the frame, shown by mixed line and referenced 57 in FIGS. 4a and 4b. The two zones 57 illustrated in FIGS. 4a and 4b are superimposed during assembly and sealing of the cell.

In the active addressing mode, in general any of the substrates carries a matrix of electrodes consisting of individualised and isolated pixels, arranged in a network organised into lines and columns, while on the other substrate, the electrode can be continuous. The latter is customarily held at a constant potential which we will call the reference potential. The electrical control signal is brought respectively to each pixel electrode of the first substrate by very thin conducting tracks. The latter are placed along the lines and the columns on the same substrate. They cross each other without making contact. Near the intersection of each line track and each column track, an active element, such as a transistor, is positioned. In this case, the line track is usually connected to the control terminal of the transistor, with the electrode of the pixel and the column track being connected to the other two main terminals of the transistor.

Control of a BiNem Display in Multiplexed Mode

Figure 3:
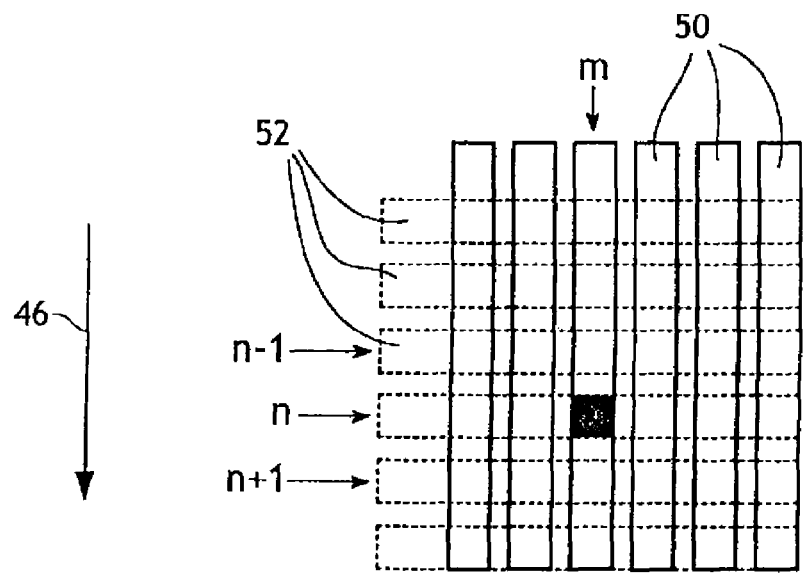

When the structure of the display is a matrix, as described previously, the addressing is effected line by line. When it is necessary to address a given line (n), an electrical signal is applied to this line, which is then described as "activated". We will call this activation signal VL. For the BiNem, we distinguish between two phases during activation, in which the first phase essentially consists of obtaining a break in the anchorage, meaning the homeotropic texture on the line concerned, by applying a voltage V1 to the line signal for example, which then constitutes a first level of VL. During the second phase, a signal V2 is applied to the line, such that V2≤V1 say, which then constitutes a second level of VL, and electrical so-called "data" signals, denoted Vc, are simultaneously applied to all the columns. The falling edge of the data signal Vc is synchronised with the falling edge of the second level of the line activation signal [1]. Depending on the value and/or the shape and/or the length of the signal Vc applied to each of the columns, the texture U or T is obtained in the pixel corresponding to the intersection of this column and the activated line [6]. Then the following line is activated in its turn, the other lines being non-activated, and so on from the first to the last line of the display. The time between the end of activation of a line and the start of activation of the next line is called the interline time $t_L$. This time is typically between 50 µs and 10 ms. The value of this time is very important to obtain clean switching, and varies substantially with temperature. In any case, time $t_L$>0. We will call this addressing method "single-step addressing". The order of activation of the lines (first n−1, then n, then n+1, etc.) determines the scanning direction 46 (FIG. 3).

Document [9], describing the creation of grey levels, specifies three variants for obtaining grey levels (figure 23 of document [9]). A first variant consists of varying the amplitude of the column signal Vc applied to the pixel P. A second variant consists of varying the length of the column signal Vc applied to the pixel P. In these two variants, the falling edge of the column signal is synchronised with the falling edge of the second level of the line signal. A third variant, called "phase modulation", consists of varying the synchronisation of the column signal Vc with the falling edge of the second level of the line activation signal.

One of the major differences to be noted between the passive mode and the active mode is that in the multiplexed passive mode, when a line p is not activated, each of the pixels of this line p is subject to the column signals corresponding to the data of the other pixels of its column, applied during the activation of the line to which they belong. In other words, when line n of pixel P(n,m) is activated by a signal VL(n), and when a signal Vc(m) is sent to column m of this pixel in order to generate the pixel signal Vp=VL(n)−Vc(m), all the pixels of column m are simultaneously subjected to Vc(m). In active addressing, during the activation of a line, the column signals are applied only to the pixels of this line. The transistors of the non-activated lines are non-conducting, and their pixels receive no signal.

According to a preferred known but non-limiting control method, prior to line by line addressing, we achieve complete addressing of the screen or at least part of the screen in a given texture, usually T, in a collective manner, by simultaneously activating all the lines or a group of lines. The lines are then addressed one by one, according to the conventional multiplexing method, to display the wanted image. This "two-steps addressing" is used in order to control the switching of the pixels more effectively, in particular for controlling the grey levels, since in this way the pixels start from a well-defined state at the beginning of the second step.

According to a preferred known but non-limiting embodiment of a BiNem display, the brushing direction of the alignment layers is orthogonal to the direction of the lines of the display, this type of display being described as "with orthogonal brushing".

Limitations Exhibited by the BiNem Displays Created According to the Prior Art

Figure 5:
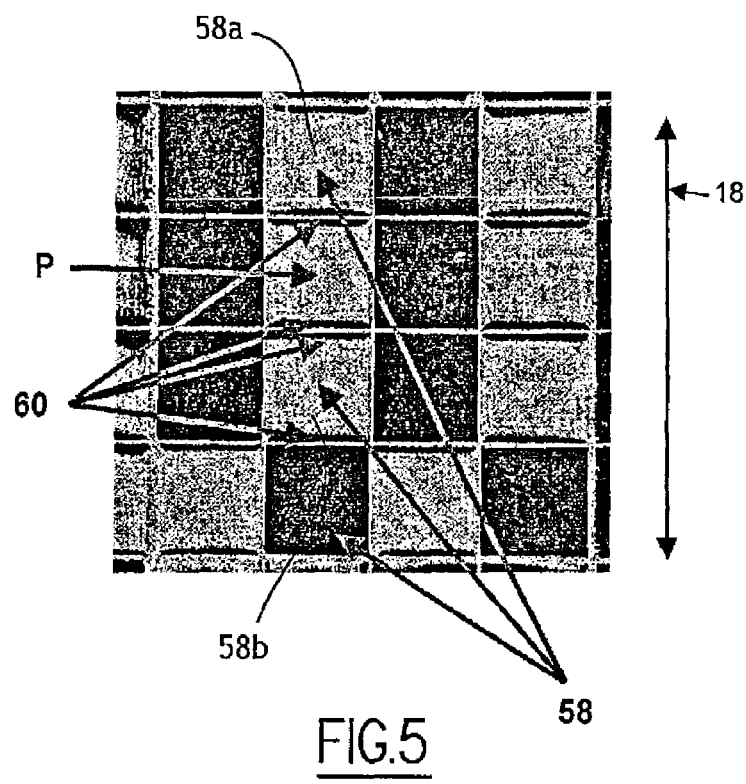

The inventors have observed that use of the flow to effect the switching of a pixel P has as a consequence that the switching of the pixel P is also sensitive to the flows created in the neighbouring pixels during the addressing method, where these flows diffuse in the pixel to be switched. The interaction of these flows, due to the neighbouring pixels, with the intrinsic flow of pixel P interferes with the switching of pixel P. The neighbouring pixels of P are defined as the pixels that are liable to interfere with its switching through their flows, and so are the pixels 58 located on either side of pixel P in the flow direction 18 (FIG. 5). When the brushing direction 40 is orthogonal to the lines, the flow direction 18 is generally parallel to the brushing direction. The neighbouring pixels to the flow direction are the pixels located on either side of P, on its column m.

When the brushing direction is indeterminate, the neighbouring pixels are those located on either side of P, according to the flow direction, which is generally parallel (to within ±10°) to the brushing direction.

When we consider all of the pixels on a line n, all of their neighbours, whatever the brushing direction, are located on the lines adjacent to line n, which is upstream of lines n−1, n−2 . . . and downstream of lines n+1,n+2 . . . . We then speak of lines neighbouring line n (in the flow direction).

One Example of Interference by Neighbours is the "Edge Effect".

During addressing of the BiNem displays, on two of the edges of the pixels that one is seeking to switch to texture T, a field can appear that switches to U. This fault is clear in FIG. 5, on pixels switched to T. At these pixels, pixel P for example, it can be seen that their edges 60 perpendicular to the brushing, and therefore to the direction of the flows 18, have switched to U instead of switching to T. In FIG. 5, the pixels switched to T are illustrated in light shading, while the pixels switched to U are illustrated in dark shading.

After lengthy analysis, the inventors have determined that these faults are explained by the fact that the flow created by the return to equilibrium of the molecules near the master plate 20 is braked at the upstream edge and at the downstream edge of pixel P. The departure of the liquid upstream of the flow in pixel P creates low pressure in the preceding neighbouring pixel 58a. Its arrival downstream creates an added pressure in the following neighbouring pixel 58b. These two effects generally brake the flow in all of pixel P. But they are particularly important at the aforementioned two edges 60 of pixel P, wherever the engine of the flow stops. Just at the edges 60 of pixel P, the speed can be twice as weak as at the centre of the latter. In these conditions the edge 60 of pixel P can never switch to T, whatever the voltage step-down of the signal on this pixel.

Figure 6:
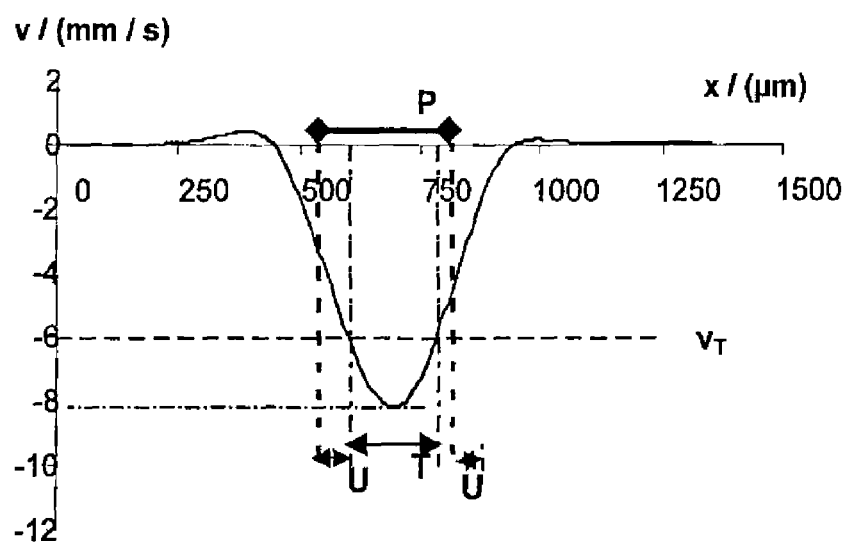

FIG. 6 explains this phenomenon. It presents, as a function of x (which corresponds to an abscissa parallel to direction 18), the average in z (the axis perpendicular to the plates 11 and 21—see FIG. 2) of the speed according to x (average speed) of the falling flow on switch-off of a slot-type signal, applied to pixel P, with an amplitude Vp=20 Volts. No other signal is applied to the display. The negative value of the speed indicates a falling flow in the opposite direction to x, and therefore in direction 16 (FIG. 2). In FIG. 6, $v_T$ represents the minimum speed of the falling flow that is necessary for switching to T. In FIG. 6 we see that at the edges of P located in direction 18, the absolute value of the speed v of the falling flow is less than $v_T$. These edges therefore switch to U.

DESCRIPTION OF THE INVENTION

The purpose of this present invention is to overcome the aforementioned drawbacks observed during embodiment of the displays known from the prior art.

This objective is attained in the context of this present invention, using a method for the control of a liquid crystal display that includes a matrix of pixels arranged in crossed lines and columns, and in which a switching of state of the liquid crystal molecules, controlled by application of an electrical control signal between two electrodes framing each pixel, generates a flow in a particular direction close to the brushing direction, characterised by the fact, in order to control the switching of at least some of the pixels, that it includes a step that consists of applying, to at least one neighbouring pixel, in the flow direction, of one pixel whose switching is to be controlled by the electrical control signal, auxiliary electrical signals whose amplitude is less than the anchorage breaking voltage and whose rising or falling edges are temporally placed in advance or in coincidence in relation to the active falling edge of the electrical control signal, so as to favour the switching of the said pixel to be controlled.

According to another characteristic of the invention, the said auxiliary electrical signals applied to at least one neighbouring pixel, are designed to induce in the said neighbouring pixel, an auxiliary flow parallel to the said general determined direction used to control the switching of the pixel to be controlled.

According to another advantageous characteristic of this present invention, the temporal shift of an edge of the auxiliary electrical signals in relation to the active falling edge of the electrical control signal is between 0 and a few tens of µs at ambient temperature, typically between 0 and 50 µs, preferably between 0 and 10 µs, and very preferably between 5 µs and 10 µs.

This present invention also concerns the liquid crystal displays used to implement the aforesaid method.

In order to control the switching of a pixel P, the invention thus essentially consists to apply, to one or more pixels located on one or other side or on either side of pixel P, in the flow direction 18 (neighbouring pixels 58), auxiliary electrical signals at a well-defined instant in relation to the signal for the switching of P. The movement of the molecules created by these auxiliary electrical signals in the neighbouring pixels induces in pixel P an auxiliary flow that is used to control the switching of pixel P.

The auxiliary signal can be sent to the neighbouring pixels by means of the line electrodes or the column electrodes or both electrode types.

The auxiliary electrical signal applied to a neighbouring pixel preferably but non-limitingly has the shape of a monopolar or bipolar slot. As will be seen later, as it rises (rising edge characterised by an increase in absolute value of the voltage), it induces a strong flow that favours the passage to U of the pixel, which switches on condition that this rising edge is applied at the right instant in relation to the pixel signal. On its descent (falling edge characterised by a reduction in absolute value of the voltage), it induces a weaker flow but one that is sufficient to help the passage to T of the pixel, which again switches on condition that this falling edge is applied at the right instant in relation to the pixel signal.

In the case of a passive matrix-type display, at the moment of addressing a line, the column signal is applied to all the pixels of each column. In the case of orthogonal brushing, the pixels of the column m are the neighbouring pixels 58 as defined previously for pixel P(n,m). The auxiliary signal can then be supplied by a signal on column m, correctly placed in time. It can be useful however to control the amplitude of the auxiliary signal by also applying a signal to the neighbouring lines of the activated line.

An auxiliary signal can also be applied to the neighbouring pixels 58 by applying a signal to the lines corresponding to these neighbouring pixels (lines n−1, n−2, n+1, n+2, etc.).

In the case of an active matrix-type display with orthogonal brushing, the invention is easier to implement than for passive addressing, in that the auxiliary signal can be applied only to the necessary neighbouring lines independently of the switching signal, since the lines are open individually.

ADVANTAGES OF THE INVENTION

One advantage of using auxiliary electrical signals in accordance with this present invention is elimination of the edge effects, as present the prior art, when the switching of a pixel to a given texture is not complete, meaning that there exists, within the pixel to be switched, a part of the latter in the unwanted texture. This advantage is present when one simultaneously switches the entire screen (the first step of two-step addressing), or simultaneously switches one part only of the screen (partial addressing), or when one switches a single line of the screen at a time (addressing in two steps or one step).

Figure 7:
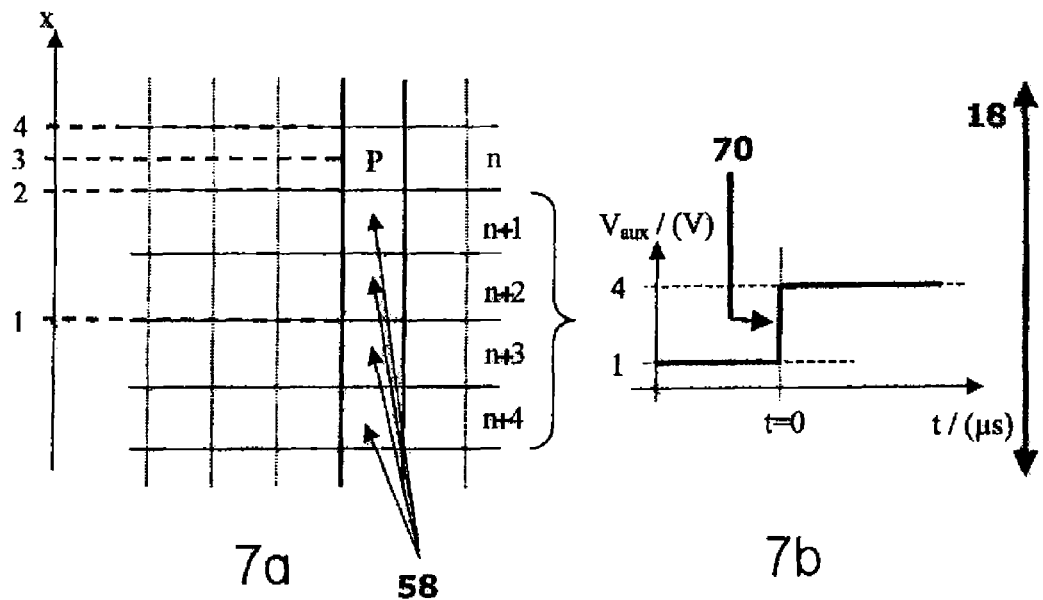
Figure 8:
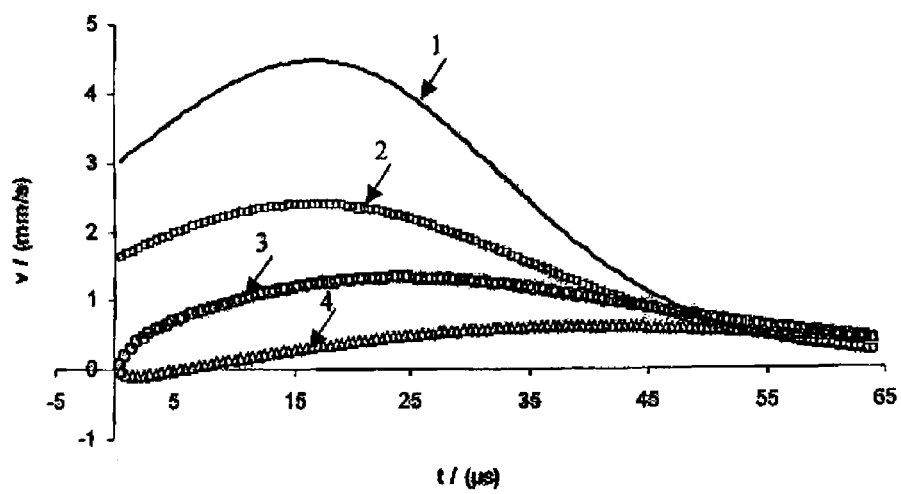
Figure 9:
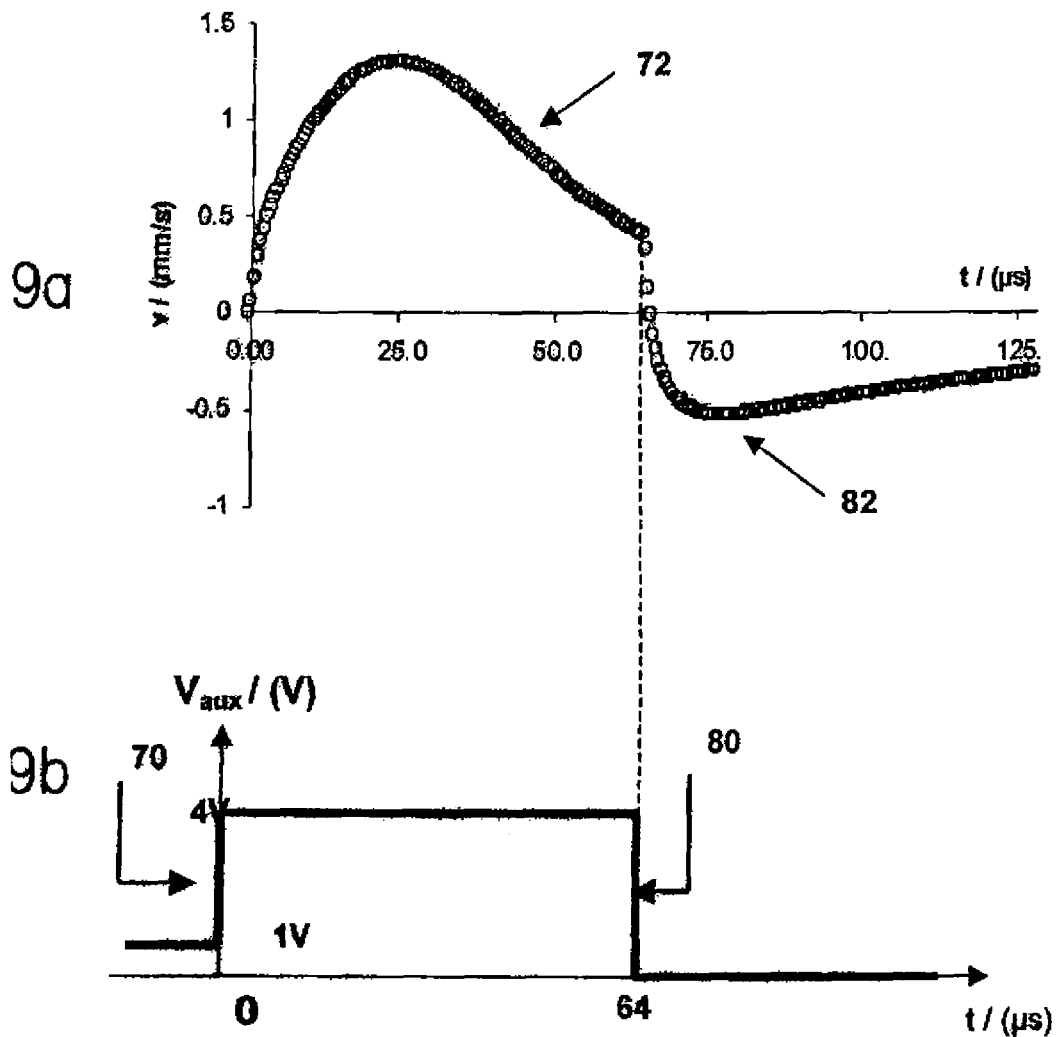
Figure 10:
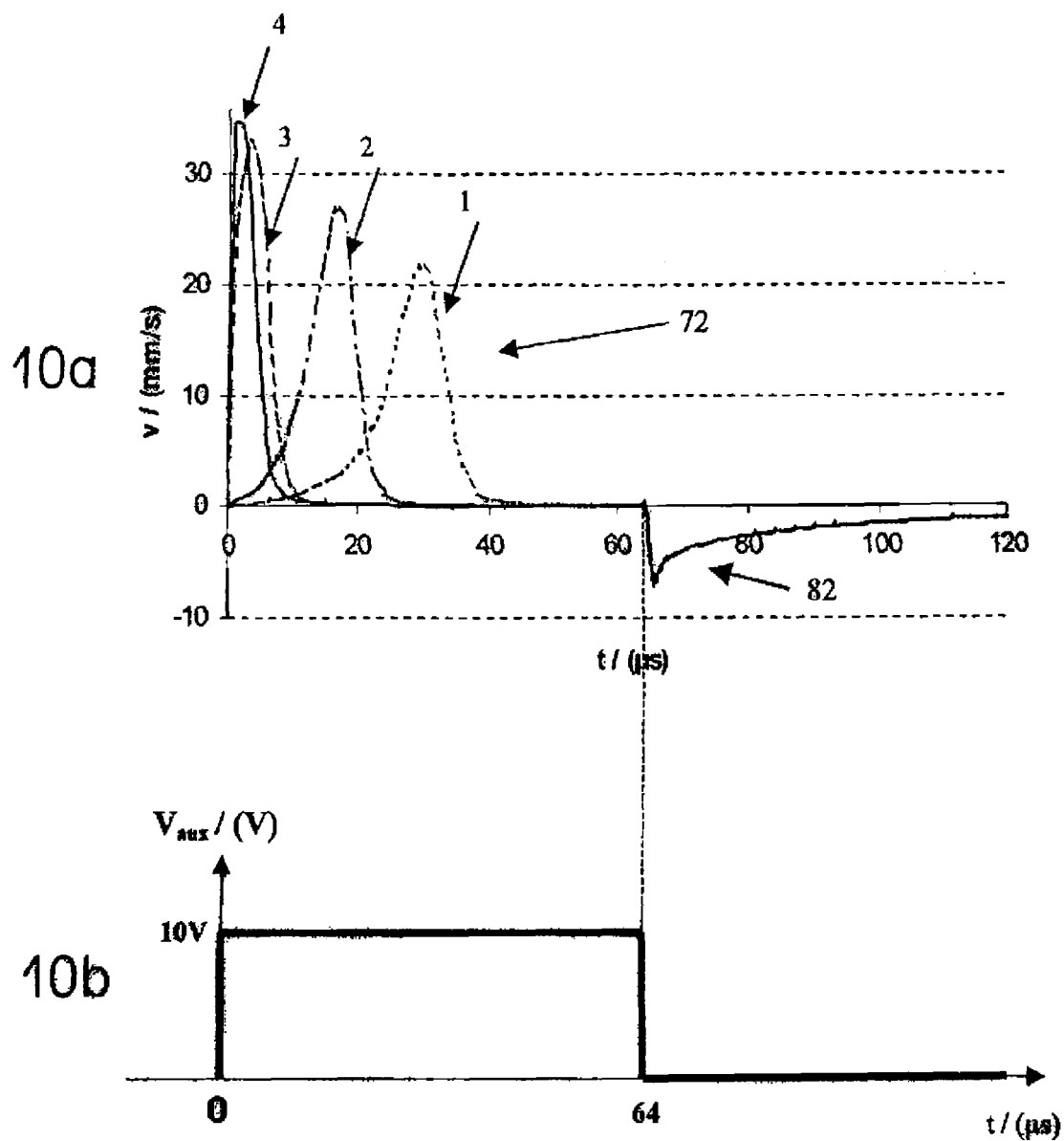
Figure 11:
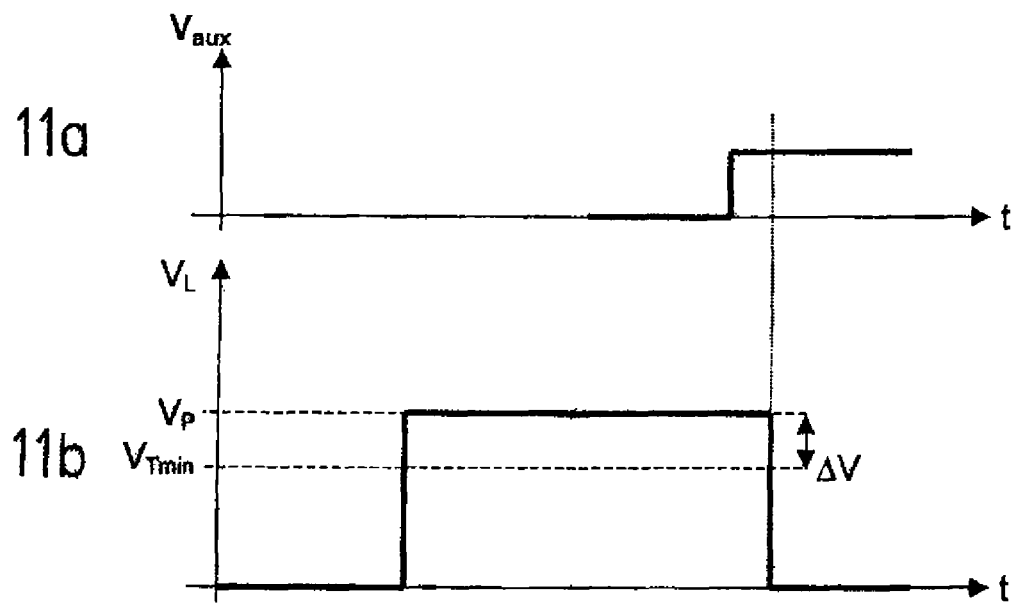
Figure 12:
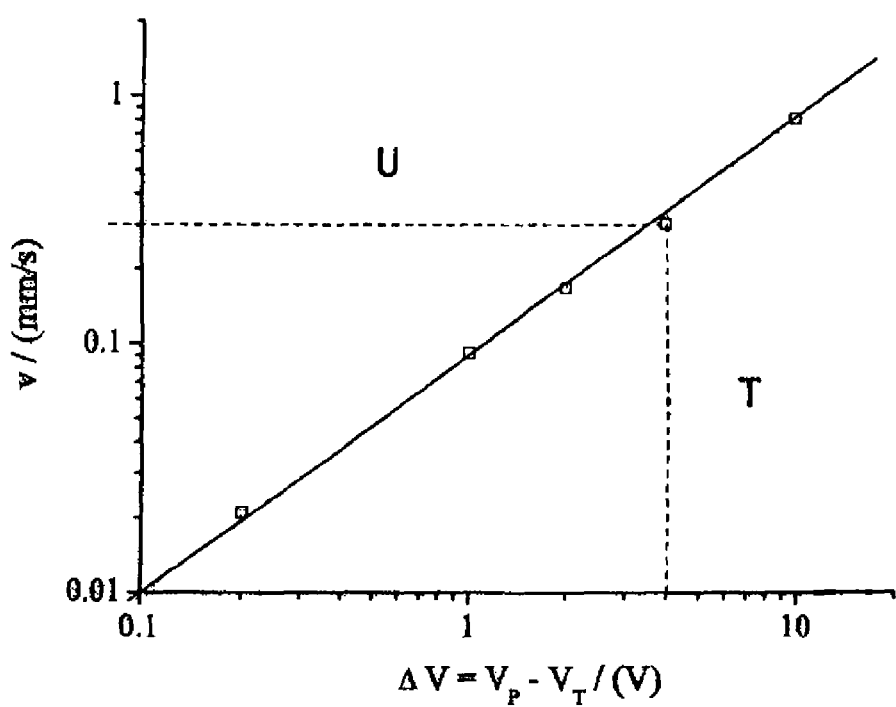

Other characteristics, aims and advantages of this present invention will appear on reading the detailed description that follows, and by referring to the appended drawings, which are provided by way of non-limiting examples and in which:

FIG. 1 shows the known operating principle of a bistable display of the BiNem type, FIG. 2 represents the falling flow used for passage to texture T in such a display, FIG. 3 illustrates the principle of conventional multiplexed passive addressing, FIG. 4 illustrates the known principles diagram of electrodes formed on the two glass substrates of a display, while FIG. 4a illustrates a mask used to etch the electrodes on the so-called upper substrate, and FIG. 4b illustrates the mask used to etch the electrodes on the so-called lower substrate, FIG. 5 illustrates the presence of an edge effect (texture U) observed on a conventional display during the switching of pixels to texture T, FIG. 6 presents the average in z of the speed according to x (average speed v) as a function of x, of the falling flow on switch-off of a slot signal applied to a pixel P, of amplitude $V_P$=20 Volts, FIG. 7 indicates, in FIG. 7a, the different positions 1, 2, 3 and 4 for which the simulations presented in FIG. 8 are effected for an auxiliary signal applied as represented in FIG. 7b, FIG. 8 presents the variation of the average speed v (average in z of the speed according to x) of the liquid crystal as a function of time, at the 4 positions 1, 2, 3 and 4 referenced in FIG. 7a, FIG. 9 shows, as a function of time, in FIG. 9a, the average speed v induced in the middle of a pixel P by a auxiliary slot signal Vaux illustrated in FIG. 9b, FIG. 10 shows, in FIG. 10a, the average speed v in the middle of the neighbouring pixels, as a function of time, for several values of the root-mean-squared voltage Vrms applied to the neighbouring pixels before the application of the auxiliary voltage illustrated in FIG. 10b, FIG. 11 illustrates, in FIG. 11a, an auxiliary rising signal in the form of a small slot signal of a few volts applied to the neighbouring pixels via the corresponding lines a few µs before the descent of the switching signal Vp applied to pixel P via its line only, and illustrated in FIG. 11b, FIG. 12 shows the amplitude of the auxiliary flow preventing the passage to T at the voltage step-down of Vp to 0. The diagram is drawn for falls of voltage greater than ΔV, to the minimum fall of $V_T$ inducing passage to T with no auxiliary flow. The auxiliary flow is generated by the auxiliary rising signal represented in FIG. 11.

Figure 13:
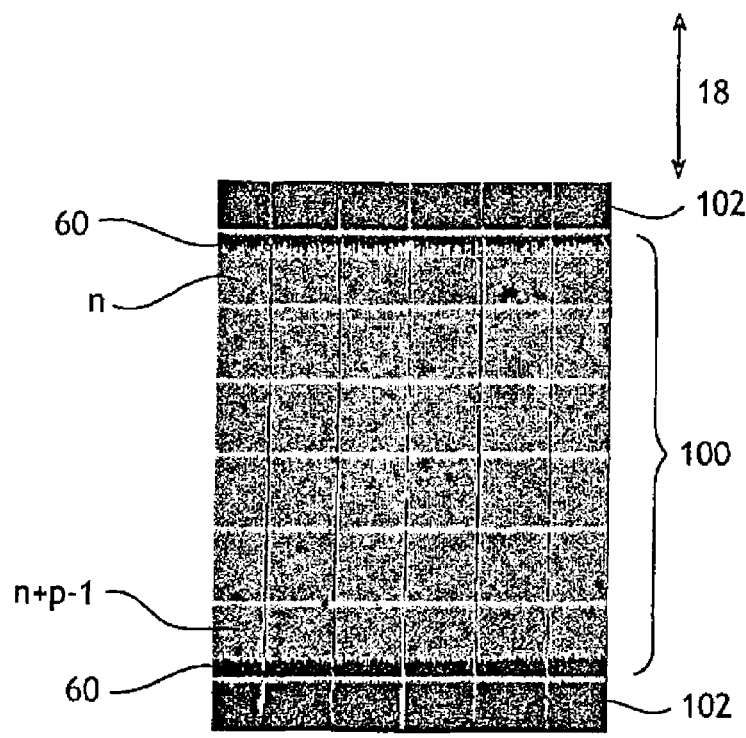
Figure 14:
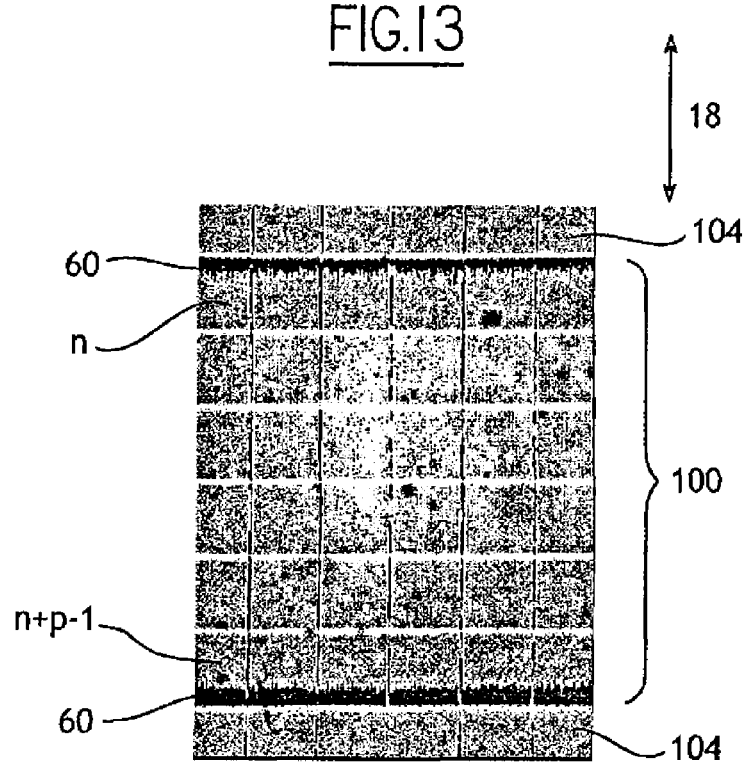
Figure 16:
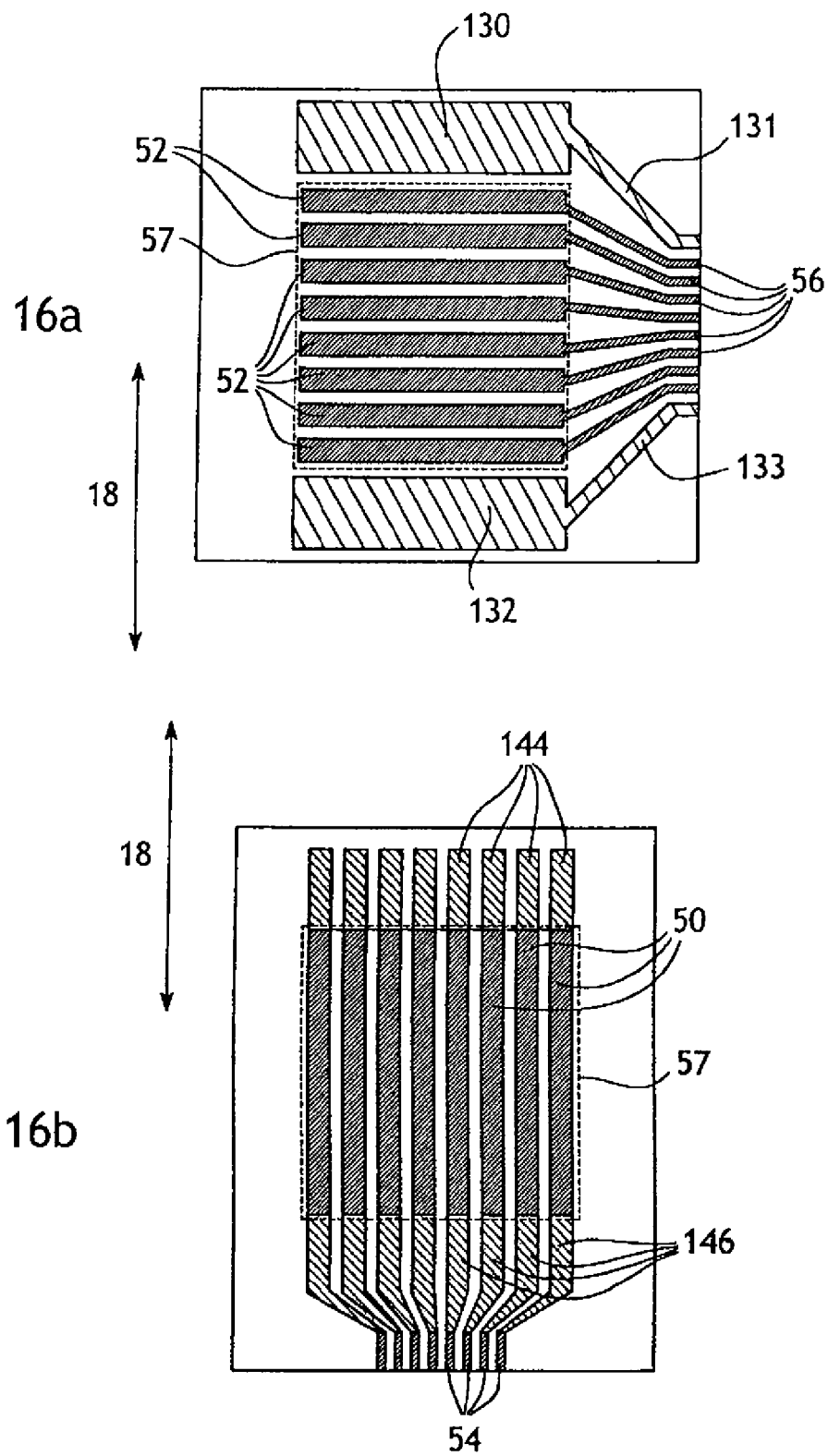
Figure 17:
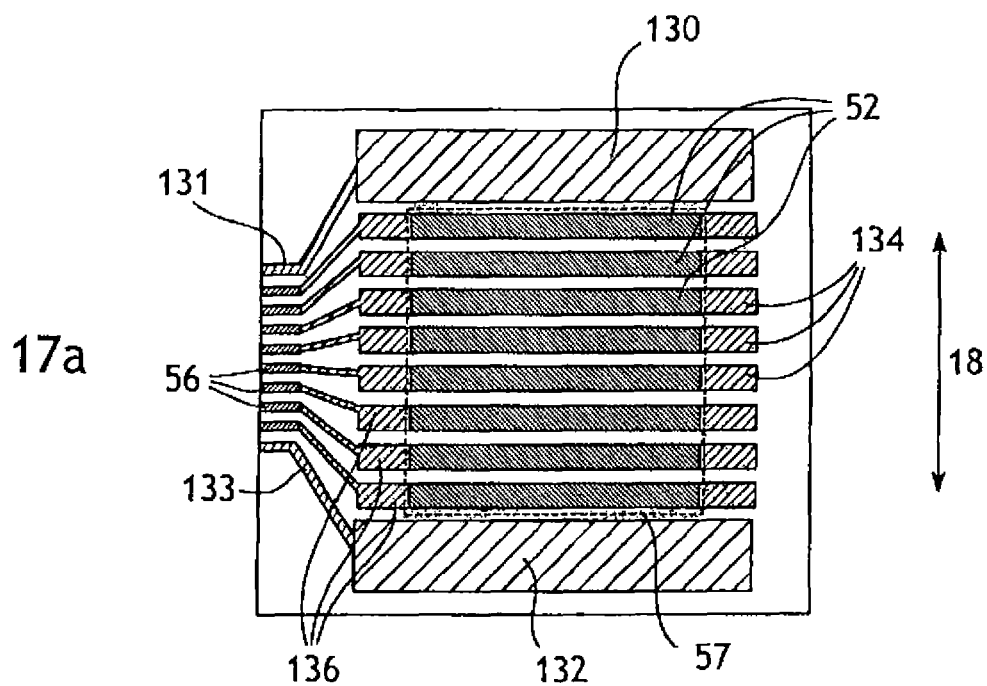
Figure 17:
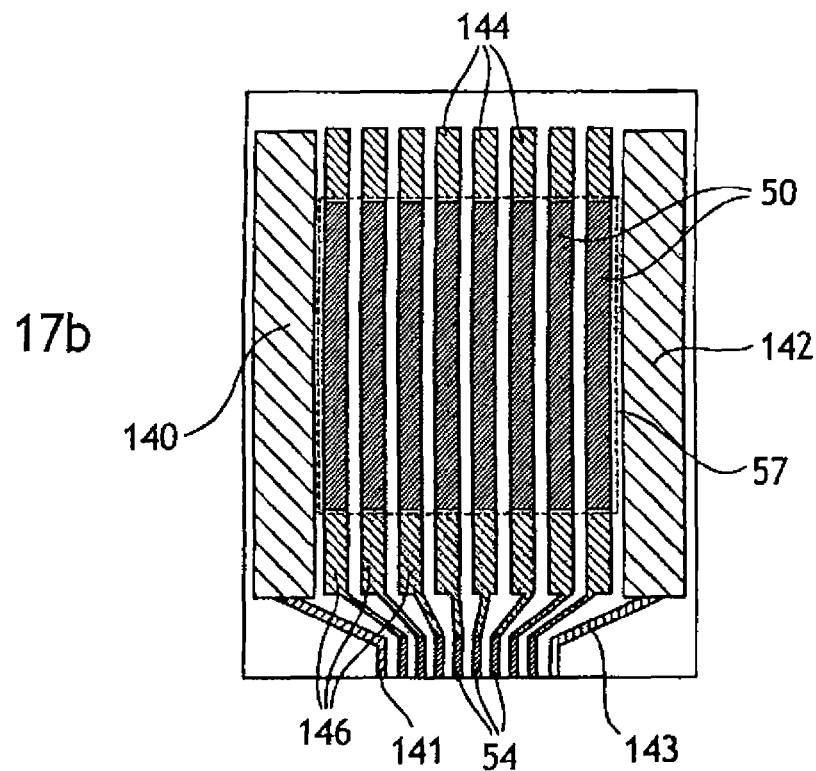

FIG. 13 illustrates the edge effects that appear when a conventional main slot-type signal is simultaneously applies to all the lines of a zone to be switched to T (lines n to n+p−1; texture T in light shading in the figure). The columns are at the reference potential, as are the lines outside of the zone to be addressed. The zones not addressed on either side of lines n to n+p−1 are in texture U (shown in dark shading in the figure), FIG. 14 illustrates the edge effects that appear when a conventional main slot-type signal is simultaneously applies to all the lines of a zone to be switched to T (lines n to n+p−1; texture T in light shading in the figure). The columns are at the reference potential as are the lines outside of the zone to be addressed. The zones not addressed on either side of lines n to n+p−1 are in texture T (shown in light shading in the figure), FIG. 15 illustrates an example of implementation of falling auxiliary signals on the lines adjacent to a zone to be addressed, to favour the passage to T at the edges of the zone to be switched to T. More precisely, in FIG. 15, we have represented by 110 the auxiliary signals applied to lines n−1 and n+p, by 112 the conventional signals for passage to T, by 114 the instant of the falling edges of the auxiliary signals 110 that coincide with the active falling edge of the conventional signal 112 for passage to T, by 100 the zone to be addressed, and by 116 the zones already addressed and that one does not wish to modify, located on the outside of the zone to be addressed 100, FIG. 15 bis diagrammatically represents a variant embodiment according to this present invention, using two feed circuits or "drivers" that control lines of interlaced electrodes, FIG. 16 shows a principles diagram for the electrodes of a display according to this present invention, which includes blocks of connected electrodes adjacent to the end lines 1 and N. FIG. 16a illustrates the electrodes on the line side, while FIG. 16b illustrates the electrodes on the column side, and FIG. 17 shows a principles diagram according to this present invention, which includes blocks of connected electrodes adjacent to end lines 1 and N, as well as an extension of the line electrodes and of the column electrodes of the display. FIG. 17a illustrates the electrodes on the line side, while FIG. 17b illustrates the electrodes on the column side.

DETAILED DESCRIPTION OF THE INVENTION

The studies conducted by the inventors, based on the invention, will now be explained, before presenting different examples of embodiment of the latter.
Study of the Flow Originating from the Neighbouring Pixels We are first going to explain the manner in which a flow originating from a neighbouring pixel, or an auxiliary flow, diffuses into a pixel to be switched, starting with an example of pixels that are firstly all placed in state T.
a) Effect of the Distance FIG. 8 shows, as a function of time, the average in z of the speed according to x of the liquid crystal v at four points of a cell, with these four points being referenced in FIG. 7a. This flow is created by an auxiliary signal Vaux formed from a step of 3 volts added to a constant signal of 1 volt, as illustrated in FIG. 7b. The step is simultaneously applied to 4 neighbouring pixels 58 contiguous with pixel P located on line n, in a cell of 1.5 µm in thickness (FIG. 7) via the corresponding lines (n+1 to n+4). In FIG. 8, curve 1 gives the average speed at a distance sufficiently distant from pixel P, for example at a distance of 2.5 pixels in relation to the centre of pixel P on the side of the four neighbouring pixels receiving the auxiliary signal. Curve 2 gives the average speed at the edge of pixel P, located on the side of the neighbouring pixels receiving the auxiliary signal. Curve 3 gives the average speed in the middle of pixel P. Curve 4 gives the average speed of the liquid crystal at the edge of pixel P, located on the side opposite to the neighbouring pixels receiving the auxiliary signal. FIG. 8 is the result of the numerical simulations.

In pixel P, there thus appears an auxiliary step flow according to x induced by the step of the neighbouring pixels under the action of the rise in auxiliary signal 70 (rising edge). This flow attenuates as it moves away from its source, and diffuses into pixel P from the neighbouring pixels in which it is generated.
b) Effect of the Fall-off In the same manner, on the sudden switch-off of the auxiliary signal (falling edge), an auxiliary falling flow is generated. FIG. 9a shows, as a function of time, the average speed v induced in the middle of pixel P by an auxiliary slot signal Vaux applied to the aforementioned four neighbouring pixels. The slot signal of 4 volts forming the auxiliary signal is applied for 64 µs to the aforementioned neighbouring pixels raised beforehand by a signal of 1 volt as illustrated in FIG. 9b.

Pixel P first experiences a positive auxiliary step flow 72 (according to x) triggered by the rise 70 of the auxiliary signal, and then an auxiliary negative falling flow 82 triggered by the sudden fall-off 80 of the auxiliary signal. The speed induced at the moment of the removal of the auxiliary signal is lower in absolute value and of opposite sign (according to −x) at the speed induced on the step.
c) Effect of the Starting State of the Neighbouring Pixels FIG. 10a shows the average speed in the middle of the neighbouring pixels as a function of time for several values of the root-mean-squared voltage Vrms applied to the neighbouring pixels before application of the auxiliary signal illustrated in FIG. 10b (curve 1: Vrms=0 V; curve 2: Vrms=0.7 V; curve 3: Vrms=1 V; curve 4 Vrms=1.4 V). The auxiliary signal, as illustrated in FIG. 10b, is a slot signal of 10V and with a length of 64 µs, applied to the four neighbouring pixels 58 as previously. The average voltage Vrms applied before the auxiliary signal has applied a preliminary step to the molecules. This step is a function of the value of Vrms.

It is observed that, depending on Vrms, the amplitude of the average speed of the auxiliary step flow 72 at the centre of the neighbouring pixels varies, but especially that the instant of the maximum of this speed is shifted substantially. To use the auxiliary step flow 72 effectively, it is necessary to take account of this phenomenon, and therefore to adjust the temporal shift between the rise 70 of the auxiliary signal and the switching signal of pixel P.

It is also observed that the average speed of the auxiliary falling flow 82 is not dependent upon Vrms.

(d) Direction of the Effect of the Auxiliary Flow

The auxiliary step flow, provoked by the rising edge of the auxiliary signal, is positive (according to x) and therefore in the opposite direction to the falling flow 32 near the master plate 20 in pixel P (according to −x), and this falling flow alone would induce passage to T of the latter. The auxiliary step flow of the neighbouring pixels opposes the falling flow, and therefore favours passage to U of pixel P.

The auxiliary falling flow provoked by the falling edge of the auxiliary signal is negative (according to −x), and therefore in the same direction as the falling flow 32 of pixel P, and this falling flow alone would induce passage to T of the latter. The auxiliary falling flow of the neighbouring pixels therefore aids the passage to T of pixel P.

e) Example of the Effectiveness of the Auxiliary Flow

FIG. 12 shows the amplitude of the auxiliary step flow preventing the passage to T of pixel P, while the fall from Vp to 0 is greater by ΔV than the fall necessary for passage to T with no auxiliary signal $V_{Tmin}$. On this curve, one can see the effectiveness of the auxiliary signal. Here $V_{Tmin}$=16 V. For $V_P$=20 V, ΔV=4V. The curve in FIG. 12 indicates a speed of 0.3 mm/s to stop passage to T. In FIG. 6, we saw that a voltage step-down Vp of 20 V creates a flow of −8 mm/s. The latter is thus countered by an auxiliary flow of 0.3 mm/s.

Thus, the rising edge of the auxiliary signal placed in advance (by 0 or even a few μs to a few tens of μs at ambient temperature and by a few tens to hundreds of μs in the cold) in relation to the active falling edge of signal Vp is used to prevent passage to T and therefore to obtain texture U. The active falling edge of Vp here is that intended to generate a sufficient falling flow 32 to obtain texture T.

In general, adjustment of the instant of the rising or falling edges of the auxiliary signal in relation to the active falling edge of signal Vp (intended to choose the texture) allows to control the final texture over all of pixel P.

When, at the start, all the pixels are in state U, phenomena of same type exist, but will not be described in detail here in order not to complicate the presentation.

The present invention offers many advantages. Though not limiting in any way, the following advantage can be mentioned in particular. During the first step of passive addressing in two steps of a continuous set of lines (addressing one area of the screen or partial addressing), the invention allows elimination of the edge effects during the switching (to T) of a zone. A variant of the invention is the use of an active "edge" to remove the edge effects on the end lines of the screen.

Example of Embodiment of the Invention

Elimination of the Edge Effect During Switching to T of a Continuous Set of Lines The Case of Partial and Passive Addressing In this first example the invention is used to remove the edge effects visible in previous conventional displays and illustrated in FIGS. 13 and 14.

In FIGS. 13 and 14 we have used the following references:
18 is the direction of the falling flow (here parallel to the brushing direction),
60 refers to the edge effects,
100 is the zone passed to texture T,
arbitrarily, n and n+p−1 are the end lines of this zone 100, and
respectively in FIG. 13, 102 refers to the zones in texture U, unaddressed, located on the outside of zone 100, and in FIG. 14, as 104 the zones in texture T, unaddressed, located on the outside of zone 100.

If the invention is not used, the aforementioned edge fault 60 appears at the outer edges of the first and last lines of a zone 100 of p lines, from n to n+p−1, which switch collectively to T (see previous paragraph on the edge effect of the prior art). This reasoning is also valid for p=1, meaning for a single line that switches to T. The brushing direction 40 is perpendicular to the lines (orthogonal brushing).

Collective switching to T of p lines is used, for example, as the first step during two-step addressing of a given zone 100 of p lines of a screen, a zone 100 that it is desired to address, with the content of the other lines 102, 104 remaining unchanged (partial addressing).

In the case of FIGS. 13 and 14, a conventional main slot-type signal (given here by way of an example but not limiting) is simultaneously applied to all the lines of the zone 100 to be switched to T. The columns are at the reference potential, as are the lines outside of the zone 100 to be addressed. It can be seen that the edge effect 60 appears whatever the texture of the pixels 102, 104 not addressed, (U in FIG. 13 or T in FIG. 14) adjacent to the switching zone 100 in direction 18.

In order to eliminate the edge effects 60 on all of line n and line n+p−1, then according to the invention, one only has to apply to their neighbouring lines, in the flow direction as specified previously, on the outside of the zone to be switched 100 (lines n−1 and n+p for example), an auxiliary signal that is correctly placed in relation to the active falling edge of Vp.

One can also apply the auxiliary signal via the columns, by simultaneously applying an auxiliary signal to all the columns, preferably of opposite polarity to the switching signal line to minimise the perturbation of these lines.

As described previously, it is a falling auxiliary signal that favours passage to T. This auxiliary signal can be a slot signal for example, whose amplitude is less than the breakage voltage and whose falling edge coincides with (or precedes), to within 10 μs for example at ambient temperature (where this value can vary substantially with the temperature) with the falling edge, which here is the active edge, of the conventional slot signal applied to the zone 100 to be switched (see FIG. 15). The auxiliary signal does not cause the neighbouring lines to switch, and therefore does not interfere with the information displayed on these lines. However the falling flow induced in the zone 100 to be switched to T, by the movement of the molecules in the neighbouring lines, is sufficient to aid the switching and to cause switching to T at the zone edges.

The second addressing step is effected in a conventional manner, line by line, by activation of lines n to n+p−1. During the time of activation of a line, a signal is simultaneously applied to the columns to obtain, for each pixel of the activated line, a passage from T to U, or T to T or indeed T to a coexistence of U and T (grey levels).

We will now describe, with reference to FIG. 15bis, a variant of embodiment according to this present invention, which uses two circuits or "drivers", D1 and D2, which control lines of interlaced electrodes.

To effect the partial addressing of a zone between line n and line n+p−1, it can be seen that the embodiment of the method described above necessitates that one applies simultaneously, during the first step, firstly a high voltage at lines n to n+p−1 to achieve the switching to T of these lines, and secondly a lower voltage to the neighbouring lines n−1 and n+p, in order not to modify the information recorded on these lines.

However this is not possible with the standard drivers available on the market, initially developed for the STN mode, and that one wishes to use for the bistable displays for reasons of cost. These drivers work as follows in fact: they can simultaneously deliver only two types of voltage: (+V or −V), as the line activation voltage, and Vm which is the voltage that we apply to the non-activated lines. It is therefore not possible, with these standard drivers, to simultaneously apply an activation signal 112 and a different auxiliary signal 110, in the present case of lower voltage.

To get around this difficulty, the inventors propose, in the context of this present invention, as illustrated in FIG. 15*bis*, to use at least two standard drivers, D1 and D2, arranged, in their linkage with the line electrodes, to provide addressing for interlaced lines associated with a specific addressing method: in design of the electrodes of the display, the lines of a given parity (even or odd) are connected to one driver D1 and the lines of the other parity are connected to another driver D2, located for example at the other side of the display zone in relation to D1, as represented in FIG. 15*bis*. Thus, two neighbouring lines, n and n+1, are not connected to the same driver but to two different drivers.

In terms of the addressing method, the first step E1 (collective switching of lines n to n+p−1, to texture T for example) is divided into two sub-steps, E'1 and E"1.

During E'1, we simultaneously send a signal for passage to T 112 (V1 or −V1) to driver D1, on lines n, n+2, . . . n+p−1 (n and n+p−1 here must have the same parity), the other lines connected to driver D1 receiving Vm, and to driver D2 we send a signal for passage to T 112 (V1 or −V1) for lines n+1, n+3, n+p−2, the other lines connected to driver D2 receiving Vm. We thus obtain a zone, between n and n+p−1, at texture T with an edge effect as described previously.

And then in a second sub-step, E"1, the signal for passage to T 112 (V1 or −V1) is applied to the end lines, n and n+p−1, via driver D1, the other lines connected to driver D1 receiving Vm, and we simultaneously apply an auxiliary signal 110 (Vaux or −Vaux) to the neighbouring lines of n (n−1 and/or n+1), and neighbours of n+p−1 (n+p−2 and/or n+p) via driver D2, the other lines connected to driver D2 receiving Vm, and this is in order to get rid of the edge effect in accordance with the principle previously described.

With this method, we use the two standard drivers, D1 and D2, to apply V1 and Vaux simultaneously to the appropriate lines. This variant of this present invention allows an optimal embodiment with standard and economical drivers.

The Case of Passive and Complete Addressing of the Screen

During two-step addressing such as described in the preceding paragraph, but this time the whole of the screen (from line 1 to N), the edge effect 60 previously described is naturally visible on the end lines: 1 and N.

To overcome this drawback, different solutions can be envisaged.

A first option is to "sacrifice" a few end lines to constitute an "edge" zone, to which we apply an auxiliary signal, and that are not used to display the content of the image. The edge effect 60 is then rejected at the end of the edge zone, which can be masked by a part of the product in which the display is housed.

In the bistable screens, it is difficult to control the texture outside of the addressed zones. To create, all around the display zone, a zone that has a controlled texture, we can also, in addition to the lines, "sacrifice" a few columns of the screen on either side of the display zone. The number of lines and columns available for the display is reduced, but the image is edged by a homogeneous zone of the same colour.

A second option, if it is desired to keep all of the lines and columns to display the image, is to render addressable, by the addition of blocks of connected electrodes, the zones adjacent to the end lines (lines 1 and N) perpendicular to the brushing direction 18. These "edge" blocks, like the lines and the columns of the matrix zone, are continued by tracks that provide the connection to the drivers or to an external voltage source. During the addressing of the display zone, it is only necessary to apply an auxiliary signal to the "edge" blocks via the corresponding tracks, in synchronisation with the addressing of the aforementioned extreme peripheral line, as described for partial addressing. The falling flow generated by the "edge" blocks results in switching to T of the extreme display zones that are liable to exhibit an edge effect if no auxiliary signal was applied. The edge effect is rejected at the end of the "edge" blocks and is masked by the party of the product in which the display is housed.

For these two options, one can envisage passing the edge zone to a given texture, texture T for example, once and for all, as it leaves the factory production line for example. The auxiliary signal is therefore a signal of low amplitude that does not break the anchorage and does not cause re-passage to T of the edge zone.

In the two options previously described, we obtain a homogeneous frame around the periphery of the screen.

In terms of the structure of the electrodes of the display, these blocks can be created in different ways.

A first way, constituting a non-limiting example and illustrated in FIG. 16, is to create, on the substrate on which the lines 52 are located, and more precisely respectively on the outside of each of the end lines 52, a "solid" block 130, 132, where each of these blocks 130, 132 works for the end line that is contiguous with it (FIG. 16*a*), and on the other substrate, with reference to the first substrate, to extend each of the strips of column electrodes 50 of the matrix zone, respectively at each of its two ends, by extensions 144, 146 located with reference to the aforementioned blocks 130, 132 (FIG. 16*b*). The blocks 130, 132 are continued by tracks 131, 133 that join onto the tracks 56 corresponding to those of the matrix zone 57 for connection to the driver. The blocks 144, 146 are themselves connected to the column electrodes 50 and are therefore controlled by the tracks 54. It is then only necessary to send an auxiliary signal, via these tracks 131, 133, to the "edge" blocks "130, 133" in synchronisation with the addressing of the extreme peripheral lines of the display zone 57, and the edge effect on these lines disappears.

In order to obtain a complete frame whose texture can be controlled, as described previously, it is possible to extend the preceding electrode structure to all of the periphery of the matrix zone 57, as illustrated in FIG. 17. To each substrate (FIGS. 17*a* and 17*b*), is added solid blocks 130, 132 and 140, 142 connected to tracks 131, 133 and 141, 143 and the electrode strips 52 and 50 are prolonged in the form of extensions 134, 136 and 144, 146 located respectively with reference to the aforementioned blocks 130, 132 and 140, 142, with the addressing principle remaining the same.

Naturally, this present invention is not limited to the embodiments that have just been described, but extends to any variant that complies with its spirit.

It will be noted in particular that the interlaced-line addressing method, described previously, is compatible with all variants that comply with the spirit of the invention.

For all of the signals described for this invention, the line and column signals can be either monopolar or bipolar, as described in document [6] for example. The reference voltage is not necessarily equal to 0 volts, and some screen drivers will work with a virtual earth.

The invention can be applied to active addressing, with greater freedom due to the independence of the column signals applied to the pixels of a given column but with different lines.

DOCUMENTS MENTIONED

Doc [1]: U.S. Pat. No. 6,327,017
Doc [2]: I. Dozov and al, "Recent improvements of bistable nematic displays switched by anchoring breaking (BiNem)", Proceeding SID 2001, p 224-227
Doc [3]: P. Martinot Lagarde et al, SPIE vol. 5003 (2003), p 25-34
Doc [4]: M. Giocondo, I. Lelidis, I. Dozov, G. Durand, Eur. Phys. J. AP5, 227 (1999)
Doc [5]: I. Dozov, Ph. Martinot-Lagarde, Phys. Rev. E., 58, 7442 (1998).
Doc [6]: FR 2 835 644
Doc [7]: US 2006-0022919
Doc [8]: U.S. Pat. No. 7,067,180
Doc [9]: WO 2004/104980

The invention claimed is:

1. A method for the control of a bistable nematic liquid crystal display having two stable textures, one of which is uniform or slightly twisted in which the molecules are substantially parallel to each other, and the other that differs from the first texture by about +/−180°, which includes a matrix of pixels arranged in crossed lines and columns, and in which a switching of state of the liquid crystal molecules, controlled by application of an electrical control signal between two electrodes (50, 52) framing each pixel, generates a flow in a particular direction (18) close to the brushing direction, wherein, to control the switching of at least some of the pixels (P), the method includes a step of applying to at least one neighbouring pixel (58) in the flow direction, of a pixel (P) whose switching must be controlled by the electrical control signal, auxiliary electrical signals whose amplitude is less than the anchorage breaking voltage and whose rising or falling edges are temporally placed in advance or in coincidence in relation to the active falling edge of the electrical control signal, so as to favour the switching of the said pixel to be controlled (P), said auxiliary electrical signals applied to at least one neighbouring pixel (58), being designed to induce in the said neighbouring pixel, an auxiliary flow parallel to said direction, allowing to control the switching of the pixel to be controlled (P) without switching said neighbouring pixel, to favor switching of a pixel (P) to a uniform or slightly twisted state (U), the rising edge of the auxiliary electrical signal is placed temporally in advance in relation to the active falling edge of the electrical control signal, to favor switching of a pixel (P) to a twisted state (T), the falling edge of the auxiliary electrical signals is place temporally in coincidence or in advance in relation to the active falling edge of the electrical control signal.

2. The method according to claim 1, wherein said auxiliary electrical signals are applied simultaneously to several neighbouring pixels (58).

3. The method according to claim 1, wherein said auxiliary electrical signals applied to at least one neighbouring pixel (58) are signals applied between two electrodes of said neighbouring pixel, and formed of voltages applied either to a line electrode in relation to a reference to a column electrode, or to a column electrode in relation to a reference to a line electrode, or between a line electrode and a column electrode.

4. The method according to claim 1, wherein said auxiliary electrical signals applied to at least one neighbouring pixel (58) are monopolar signals.

5. The method according to claim 1, wherein said auxiliary electrical signals applied to at least one neighbouring pixel (58) are bipolar signals.

6. The method according to claim 1, wherein the brushing direction (40) of the substrates (10, 20) of the display is perpendicular to line electrodes (52) and that the auxiliary electrical signals include signals applied to the column electrodes (50) and placed temporally in relation to the active falling edge of the electrical control signal.

7. The method according to claim 1, wherein the auxiliary electrical signals include signals applied to at least one line electrode adjacent to the pixel (P) to be controlled.

8. The method according to claim 1, wherein the temporal offset of an edge of the auxiliary electrical signals in elation to the active falling edge of the electrical control signal is between 0 and a few tens of μs at ambient temperature, and preferably between 5 μs and 10 μs.

9. The method according to claim 1, wherein to control the switching of at least one display line to a chosen state, typically a twisted state (T), the auxiliary electrical signal is a signal applied to at least one neighbouring line, whose amplitude is less than a breakage voltage and whose falling edge is placed in coincidence with or in advance of a time that is controlled in relation to the active falling edge of the electrical control signal.

10. The method according to claim 1, wherein to control the switching of at least one display line to a chosen state, typically a twisted state (T), the auxiliary electrical signal is a signal applied to several neighbouring lines, whose amplitude is less than a breakage voltage and whose falling edge is placed in coincidence with or in advance of a time that is controlled in relation to the active falling edge of the control signal.

11. The method according to claim 1, wherein to control the switching of several display lines to a chosen state, typically a twisted state (T), the auxiliary electrical signal is a signal applied to at least one neighbouring line, whose amplitude is less than a breakage voltage and whose falling edge is placed in coincidence with or in advance of a time that is controlled in relation to the active falling edge of the control signal.

12. The method according to claim 1, wherein the method is applied to a display with active addressing.

13. The method according to claim 1, employing two control circuits or drivers (D1, D2) connected alternately to interlaced line electrodes (n, n+2, ... n+p−1; n+1, n+3, ... n+p−2) so that any two neighbouring lines, n and n+1, are connected to two different drivers.

14. The method according to claim 13, wherein the two drivers (D1, D2), at least during certain operating sequences, simultaneously and respectively apply firstly activation signals to certain lines and secondly auxiliary electrical signals to certain other lines.

15. The method according to claim 13, wherein the method employs an addressing method that includes a step (E1) for collective switching of lines (n to n+p−1), to a given texture (T), which is divided into two sub-steps (E'1, E"1)

During a first sub-step (E'1), a first driver (D1) simultaneously sends a signal (112) for passage to said texture (T) on the lines that are connected to it concerned by the collective switching (n, n+2, . . . n+p−1) and a signal Vm on the other lines connected to the first driver (D1), while the second driver (D2) simultaneously sends a signal (112) for passage to said texture (T) on the lines that are connected to it concerned by the collective switching (n+1, n+3, . . . n+p−2), and a signal Vm on the other lines connected to the second driver (D2), And then in a second sub-step (E"1), the first driver (D1) simultaneously applies a signal (112, V1 or −V1) for passage to said texture (T) on the end lines that are connected to the first driver concerned by the collective switching (n and n+p−1) and a signal Vtn on the other lines connected to the first driver (D1), while the second driver (D2) simultaneously sends an auxiliary electrical signal (110; Vaux or −Vaux) on the lines n−1 and/or n+1; n+p−2 and/or n+p), neighbours of the end lines that are concerned by the collective switching (n and n+p−1) and a signal Vm on the other lines connected to the second driver (D2).

16. The method according to claim 13, wherein the two drivers (D1, D2), at least during certain operating sequences, apply to the respective lines, activation signals that overlap temporally.

17. A bistable nematic liquid crystal display having two stable textures, one of which is uniform or slightly twisted in which the molecules are substantially parallel to each other, and the other that differs from the first texture by about +/−180° including a matrix of pixels arranged in crossed lines and columns, and in which a switching of state of the liquid crystal molecules, controlled by application of an electrical control signal between two electrodes (50, 52) framing each pixel, generates a flow in a particular direction (18), and comprising a driver circuit to control the switching of at least some of the pixels (P), applying to at least one neighbouring pixel (58), in the flow direction, of a pixel (P) whose switching must be controlled by the electrical control signal, auxiliary electrical signals, whose rising or falling edges are temporally located in advance or in coincidence in relation to the active falling edge of the electrical control signal, so as to favour the switching of the said pixel to be controlled (P), said driver circuit being configured to generate auxiliary electrical signals applied to at least one neighbouring pixel (58), to induce in said neighbouring pixel, an auxiliary flow parallel to the said direction, allowing to control the citing of the pixel to be controlled (P), said switching being:

i) to a uniform or slightly twisted state (U), when the rising edge of the auxiliary electrical signal is placed temporally in advance in relation to the active falling edge of the electrical control signal, ii) to a twisted state (T), when the falling edge of the auxiliary electrical signals is place temporally in coincidence or in advance in relation to the active falling edge of the electrical control signal.

18. The display according to claim 17, wherein the display includes line and/or column electrodes and/or edge blocks located outside of the display zone.

19. The display according to claim 17, wherein the display includes line and/or column electrodes and/or edge blocks located outside of the display zone and whose state is imposed during manufacture.

20. The display according to claim 17, wherein the display includes line and/or column electrodes and/or edge blocks located outside of the display zone whose state is controlled by auxiliary signals applied during the first step of a two-step addressing method.

* * * * *

UNITED STATES PATENT AND TRADEMARK OFFICE
CERTIFICATE OF CORRECTION

PATENT NO. : 8,704,976 B2
APPLICATION NO. : 12/528310
DATED : April 22, 2014
INVENTOR(S) : Philippe Martinot-Lagarde, Stephane Joly and Jean Denis Laffitte It is certified that error appears in the above-identified patent and that said Letters Patent is hereby corrected as shown below:

In the Claims,

Column 16, Claim 8, line 22, please delete "elation" and insert --relation--.

Column 17, Claim 15, line 13, please delete "Vtn" and insert --Vm--.

Column 18, Claim 17, line 12, please delete "citing" and insert --switching--.

Signed and Sealed this
Twenty-first Day of October, 2014

Michelle K. Lee
*Deputy Director of the United States Patent and Trademark Office*